United States Patent [19]

Besse et al.

[11] 4,439,122
[45] Mar. 27, 1984

[54] DEVICE FOR FABRICATING PANELS OF EXPANDED SYNTHETIC MATERIALS

[75] Inventors: Maurice Besse, Leysin; Jacques Grisoni, La Croix-sur-Lutry, both of Switzerland

[73] Assignee: Fresse S.A., Switzerland

[21] Appl. No.: 442,520

[22] Filed: Nov. 17, 1982

[30] Foreign Application Priority Data

Nov. 18, 1981 [EP] European Pat. Off. ......... 81201273.0

[51] Int. Cl.³ .............................................. B29D 27/00
[52] U.S. Cl. ..................... 425/4 R; 249/64; 249/66 R; 249/145; 249/151; 249/176; 264/51; 264/87; 264/101; 264/336; 425/85; 425/257; 425/444; 425/817 R
[58] Field of Search ................... 264/51, 53, DIG. 11, 264/87, 101, 336; 425/4 R, 85, 257, 444, 817 R; 249/64, 66 R, 145, 151, 176

[56] References Cited

U.S. PATENT DOCUMENTS

| 2,948,926 | 8/1960 | Kühn .................... 264/51 |
| 3,035,280 | 5/1962 | Hackländer .............. 264/51 X |
| 3,214,794 | 11/1965 | Otis ..................... 425/4 R |
| 3,264,381 | 8/1966 | Stevens ................. 264/53 X |
| 3,281,510 | 10/1966 | Lovret .................. 264/51 X |
| 3,537,131 | 11/1970 | Kracht et al. ........... 264/53 X |

FOREIGN PATENT DOCUMENTS

| 31171 | 7/1981 | European Pat. Off. . |
| 53-126071 | 11/1978 | Japan ................... 425/4 R |
| 448501 | 4/1968 | Switzerland ............. 249/142 |

OTHER PUBLICATIONS

Franson, G. R., "Fabrication Methods for Expandable Polystyrene," In *Plastics Technology*, Jul. 1956, pp. 452–455.

*Primary Examiner*—Philip E. Anderson
*Attorney, Agent, or Firm*—Kane, Dalsimer, Kane, Sullivan and Kurucz

[57] ABSTRACT

The installation comprises a rectangular, parallelepipedal, leaktight steam chamber (1) provided with a gate (2) on one of the short sides, inside which a tubular fixed mold (4) of perforated steel plate is attached at a distance from the walls of the chamber, the shape of the mold corresponding to the external shape of the panel to be obtained. A first set of fixed, parallel, perforated metal tubes (5), inside the mold (4), possesses lateral holes (9) for the passage of a second set of perforated or non-perforated metal tubes (10) firmly fixed to a movable external support (11), passing through one of the short walls of the steam chamber (1) and capable of moving perpendicular to the tubes (5) of the first set, passing through the latter. The chamber (1) is provided with inlet valves (13) for the partially expanded synthetic material, an inlet (14) for steam and an inlet (15) for a cooling fluid. An extractor (19, 20) works in parallel with the tubes (5) of the first group to push the molded panel out of the mold by causing it to slide over these tubes. One of the ends of the tubes (5) located inside the steam chamber is closed, in the molding position, and provided with a nozzle (7) for the injection of a cooling liquid, while the other end communicates with the steam chamber (1).

5 Claims, 3 Drawing Figures

DEVICE FOR FABRICATING PANELS OF EXPANDED SYNTHETIC MATERIALS

The present invention relates to an installation for the manufacture of panels of steam-expanded synthetic material, possessing two groups of intercommunicating, intersecting, parallel, rectilinear tubular passages.

Such panels are used for construction, for example, as described in European Patent Application No. 0,031,171, which envisages filling the tubular passages in the panel with concrete. Hitherto, it has been necessary to make the panels in two separately molded parts, so as to have two groups of impressions forming the desired tubular passages after the two parts have been joined and stuck. This manufacturing process therefore requires adjustment of the two parts in order to place a lining or other cardboard material in the tubular passages.

The object of the present invention is to make such a panel in a single piece, that is to say in a single operation, so as to obtain precise tubular passages and a more homogeneous panel at a much lower cost price.

For this purpose, the installation according to the invention comprises a rectangular, parallelepipedal leaktight steam chamber provided with a gate on one of the short sides, inside which a tubular fixed mold of perforated steel plate is attached at a distance from the walls of the chamber, the shape of the mold corresponding to the external shape of the panel to be obtained, a first set of fixed, parallel, perforated metal tubes inside the mold, corresponding to one of the groups of tubular passages to be obtained in the panel, these tubes possessing lateral holes for the passage of a second set of perforated or non-perforated metal tubes firmly fixed to a movable external support, passing through one of the short walls of the steam chamber and capable of moving perpendicular to the tubes of the first set, passing through the latter, and this second set of tubes corresponding to the second group of tubular passages, and at least: an inlet valve for the partially expanded synthetic material, an inlet for the steam and for a cooling fluid, and an extractor working in parallel with the tubes of the first group to push the molded panel out of the mold by causing it to slide over the tubes of the first group, one of the ends of the tubes located inside the steam chamber being closed, in the molding position, and provided with a nozzle for the injection of a cooling liquid, while the other end communicates with the steam chamber and while those ends of the movable tubes which are located on the outside are open.

The installation according to the invention therefore includes, apart from the gate, only one movable part, which consists of one of the sets of tubes. Such an installation is consequently relatively inexpensive and simple to construct. Moreover, the use of a set of fixed tubes not only has the effect of simplifying the construction, but also makes it possible to push the molding out of the mold before the expanded material has cooled completely, for example at a temperature as high as 25° to 30° C., without risk of deformation, the tubes supporting the panel whilst it is sliding over them. Furthermore, as the cooling of the panel also takes place via the inside of the fixed tubes, the cooling liquid also being injected through the closed ends carrying the nozzles, it is not necessary to wait until the whole mass of the panel has cooled completely, because the cooled walls of the tubular passages and of the panel are capable of supporting the panel so that is can cool completely outside the mold. In the absence of the tubes, it would be necessary to wait until the panel had cooled to a temperature of about 15° C. This therefore represents a considerable saving in terms of time and energy. Because of the fact that the movable tubes are perforated and that they communicate with the outside, the pressurized steam introduced into the steam chamber and the fixed tubes diffuses rapidly through the beads of expandable material, preferably polystyrene, to enter the movable tubes through their perforations, in which tubes the prevailing pressure is lower than the overpressure of the steam. This diffusion can be increased by creating a forced partial vacuum in these tubes. This rapid diffusion of the steam ensures virtually uniform heating of the polystyrene beads, making it possible to obtain a homogneous panel of good quality. A poor diffusion of the steam would have the effect of creating an insulating outer crust, preventing the heating of the polystyrene beads located inside. If the fixed tubes are close to one another and have substantially larger diameters than the movable tubes, it is possible to use non-perforated movable tubes, the perforated surface of the fixed tubes being amply sufficient to ensure a good diffusion of the steam. After the expansion of the polystyrene, the expanded material is subjected to forced cooling by introducing a cooling fluid in place of the steam, the cooling fluid generally being water sprayed into a stream of air.

The attached drawing shows an embodiment of the invention by way of example.

Figure 1:
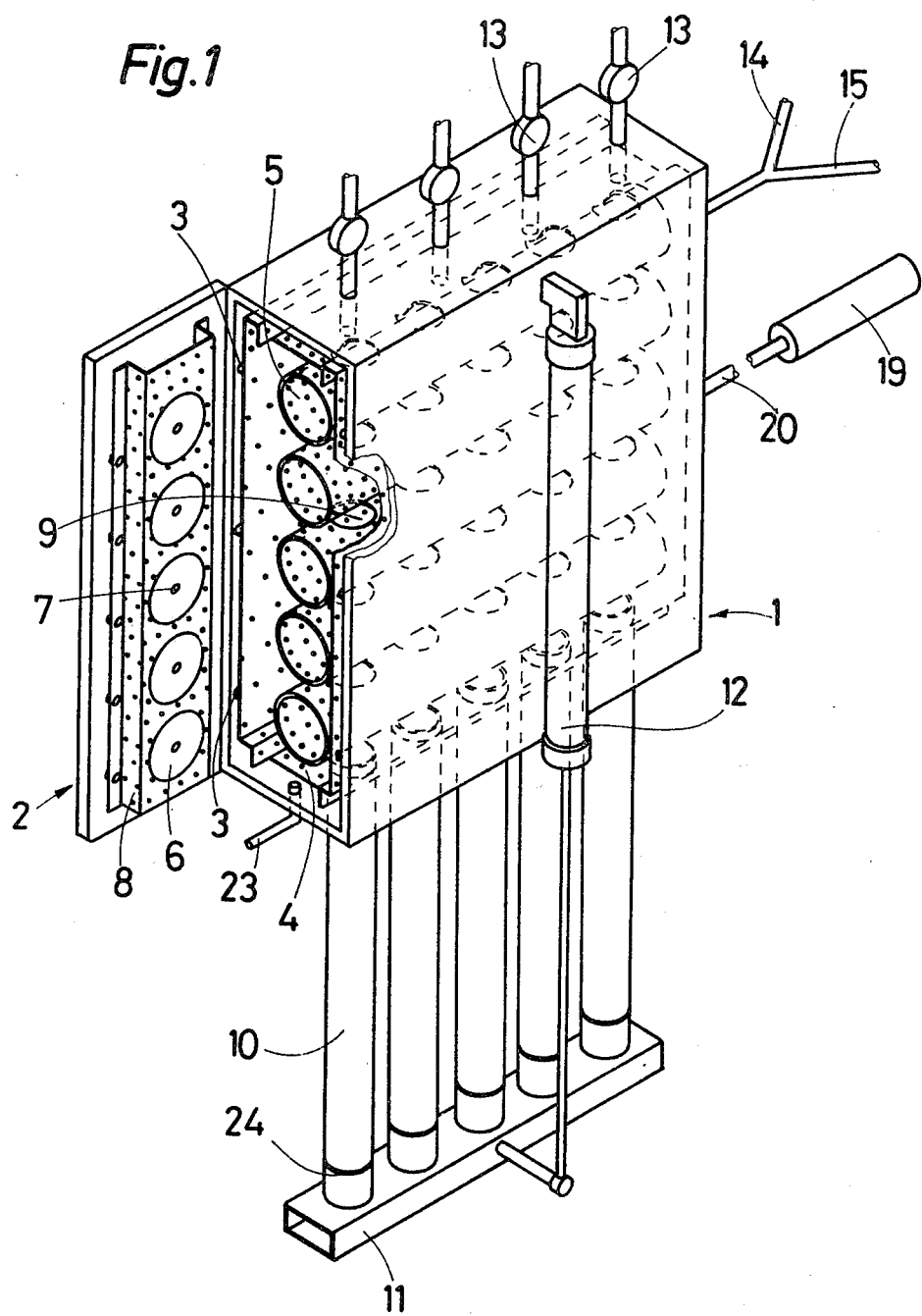
FIG. 1 is a general view of the installation in perspective.

The installation includes a leaktight, rectangular parallelepipedal chamber 1 closed by a double-walled gate 2. A mold 4 of perforated steel plate is attached, by spacers 3, to the inside of the chamber, at a distance from its walls, the shape of the mold corresponding to the external shape of the panel. A first set of parallel cylindrical tubes 5 of perforated steel plate, open at both ends, is attached to the inside of the mold 4 by one of the ends of the tube communicating with the steam chamber 1. The other end of the tube 5 is closed, in the molding position, by leaktight zones 6 in the second wall 8, of perforated steel plate, of the gate 2, which wall forms the missing short face of the mold 4. The diameter of the leaktight zones 6 is slightly greater than that of the ends of the tubes 5, and the zones are provided at their center with a nozzle 7 for the injection of the cooling liquid. The tubes 5 are provided with lateral holes 9 to allow the passage of a second set of movable tubes 10 perpendicular to the first. The tubes 10 are made of non-perforated steel plate if the fixed tubes 5 are close to one another and have a substantially larger diameter than the movable tubes, and are otherwise made of perforated steel plate. The movable tubes 10 communicate with the hollow support 11 to which they are attached. The displacement of the second set of tubes 10 is ensured by one or two jacks 12 arranged on either side of the chamber 1. The tubes 10 pass through the lower short face of the steam chamber 1 and of the mold 4, their perforated upper ends coming to bear against non-perforated zones in the upper face of the mold 4, in the molding position. The leaktightness of the chamber 1 is ensured by O-ring seals 24 attached near the lower end of the tubes 10. Several valves 13 control the introduction of the partially expanded synthetic materail into the mold 4. Inlets 14 and 15 respectively and successively ensure the introduction of the steam and the cooling liquid into the chamber 1.

Figure 2:
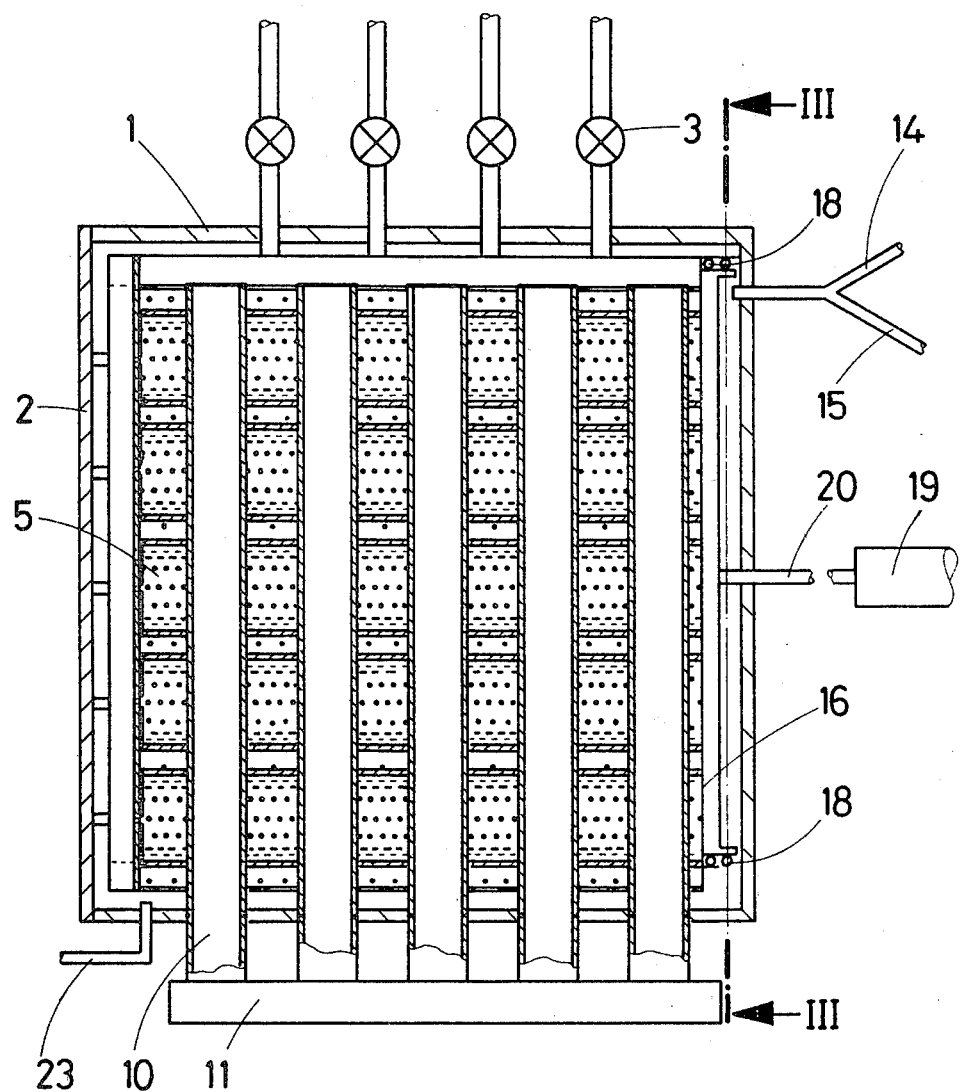
FIG. 2 is a right-hand view of the previous figure in section.
Figure 3:
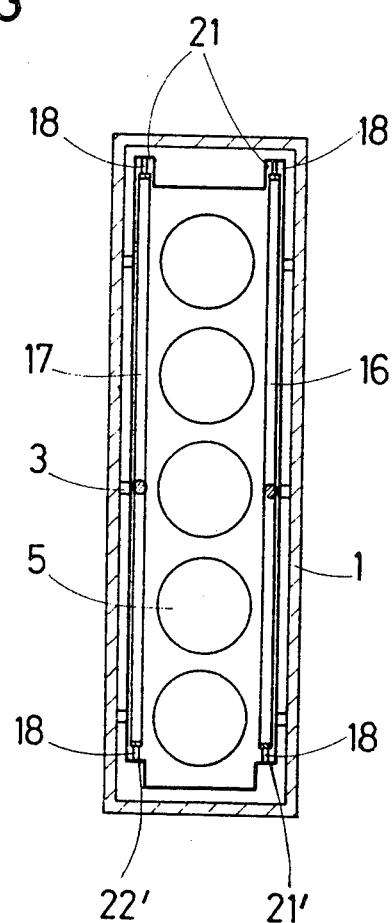
FIG. 3 is a view in section along the line III—III.

The panel is extracted by an extractor (FIGS. 2, 3) comprising, inside the mold 4, two movable metal bars 16 and 17 which are arranged, in the molding position, against the wall of the mold 4 facing the gate 2, on either side of the set of fixed tubes 5, and which are provided at their ends with a rolling device 18 and, outside the mold 4 and the steam chamber, with two jacks 19, the rods 20 of which pass through the chamber 1 and the mold 4 to control the displacement of the two bars 16, 17. The upper ends of the bars 16, 17 are guided by the grooves 21, 22 in the mold, which are intended to close the walls of the female scarf of the panel, while the lower ends roll on the bearings 21', 22' of the male scarf.

The steam chamber 1 is also provided with a line 23 enabling the cooling liquid to be discharged.

The operations for the manufacture of a panel are as follows:

The gate 2 of the chamber 1 is closed and the movable tubes 10 are introduced into the mold 4. The partially expanded particulate synthetic material, namely polstyrene or polyethylene, is introduced via the valves 13, and the steam is then introduced through the inlet 14. The steam passes through the perforated walls of the mold 4, including the walls of the fixed tubes 5, and diffuses through the synthetic material. After the synthetic material has expanded, the steam inlet 14 is closed and the cooling liquid, which is water sprayed into a stream of air, is sent through the inlet 15. The cooling liquid passes through the perforated walls of the mold and flows through the vertical tubular passages left by the movable tubes 10, which are located in the low position during cooling. The liquid is discharged through the movable tubes 10, the upper end of which is perforated, and passes through their hollow support 11. The hollow support 11 can advantageously be connected to suction means in order to accelerate the discharging of the cooling liquid, and, in the case where the movable tubes are perforated, in order to create a partial vacuum inside these movable tubes during molding, promoting the rapid diffusion of the steam into the material to be expanded. The cooling liquid is injected into the fixed tubes 5 through the nozzles 7, so that the cooling of the panel is accelerated. when the temperature of the panel is between 25° and 30° C., the cooling is stopped and the gate 2 is opened, the jacks 19 act on the bars 16, 17 and the latter push the panel out of the mold by causing it to slide over the tubes 5. After the gate 2 has been closed again, the operation is restarted.

It is obvious that the shape of the tubular passages in the panel can have a cross-section other than circular, for example rectangular; likewise, the lateral walls of the panel can be provided with channels, for example for accommodating electrical conductors or decorative elements or for another purpose.

It is possible to use a steam chamber containing two molds if the panel has a small width.

The same installation can be used for the production of panels of phenolic foam or polyurethane, these materials being expanded in the cold. Obviously, in this case, the steam chamber is unnecessary, but the principle of making, in one piece a panel possessing two groups of tubular passages remains the same.

We claim:

1. An installation for the manufacture of panels of steam-expandable particulate synthetic material, possessing two groups of intercommunicating, intersecting, parallel, rectilinear tubular passages, which comprises a rectangular, parallelepipedal leaktight steam chamber provided with a gate on one of the short sides, inside which a tubular fixed mold of perforated steel plate is attached at a distance from the walls of the chamber, the shape of the mold corresponding to the external shape of the panel to be obtained, a first set of fixed, parallel, perforated metal tubes inside the mold, corresponding to one of the groups of tubular passages to be obtained in the panel, these tubes possessing lateral holes for the passage of a second set of perforated or non-perforated metal tubes firmly fixed to a movable external support, passing through one of the short walls of the steam chamber and capable of moving perpendicular to the tubes of the first set, passing through the latter, and this second set of tubes corresponding to the second group of tubular passages, and at least: an inlet valve for the partially expanded particulate synthetic material, an inlet for the steam and for a cooling fluid, and an extractor working in parallel with the tubes of the first group to push the molded panel out of the mold by causing it to slide over the tubes of the first group, one of the ends of the tubes located inside the steam chamber being closed, in the molding position, and provided with a nozzle for the injection of a cooling liquid, while the other end communicates with the steam chamber and while those ends of the movable tubes which are located on the outside are open.

2. The installation as claimed in claim 1, which comprises means for creating a partial vacuum in the steam chamber and/or inside at least one of the sets of tubes.

3. The installation as claimed in claim 1, wherein one of the ends of the tubes of the first group is closed, in the molding position, by non-perforated zones in that walls of the mold which forms part of the gate, the zones being provided with the said nozzles.

4. The installation as claimed in claim 1, wherein the free ends of the movable tubes are closed, in the molding position, by non-perforated zones in that wall of the mold against which the tubes come to bear, the zones being open, in the mold-release position, in order to enable the cooling liquid to be discharged through the said tubes.

5. The installation as claimed in claim 1, wherein the support of the movable tubes is hollow, communicates with the tubes and is connected to suction means.

* * * * *